United States Patent [19]

Knoedler et al.

[11] Patent Number: 4,984,845
[45] Date of Patent: Jan. 15, 1991

[54] VEHICLE SEAT FOR A CHILD

[75] Inventors: Roy E. Knoedler, Boulder; William G. Au, Northglenn; Robert M. Parker, Aurora, all of Colo.

[73] Assignee: Gerry Baby Products Company, Denver, Colo.

[21] Appl. No.: 338,299

[22] Filed: Apr. 14, 1989

[51] Int. Cl.⁵ .............................................. A47D 1/10
[52] U.S. Cl. ................................. 297/250; 297/487; 297/488
[58] Field of Search ............... 297/487, 488, 150, 151, 297/250, 216, 154, 155

[56] References Cited

U.S. PATENT DOCUMENTS

| 3,767,259 | 10/1973 | Blake et al. | 297/488 X |
| 3,948,556 | 4/1976 | Hyde et al. | 297/250 |
| 4,545,613 | 10/1985 | Martel et al. | 297/250 |
| 4,568,122 | 2/1986 | Kain | 297/488 |
| 4,643,474 | 2/1987 | Wise | 297/488 |
| 4,671,574 | 6/1987 | Kassai | 297/487 |
| 4,754,999 | 7/1988 | Kain | 297/250 |
| 4,795,209 | 2/1989 | Quinlan, Jr. et al. | 297/153 |

FOREIGN PATENT DOCUMENTS

393088 2/1922 Fed. Rep. of Germany ...... 297/153

Primary Examiner—Peter R. Brown
Attorney, Agent, or Firm—Sheridan, Ross & McIntosh

[57] ABSTRACT

A child's car seat is provided that includes a seat belt assembly and a shield assembly. The seat belt assembly includes a seat belt that engages the lap of the child. A vehicle seat belt retains the car seat at the back of the vehicle seat. The seat belt of the child's car seat remains fixed in position once the child is secured in position. As a result, the child cannot extend the length of the seat belt and defeat its restraining purpose. The shield assembly can be positioned on either of two different sides to facilitate seating/unseating of the child in/from the car seat. The shield assembly can be removed whereby remaining portions of the car seat can be used with a vehicle lap belt to support and restrain the child.

9 Claims, 8 Drawing Sheets

VEHICLE SEAT FOR A CHILD

FIELD OF THE INVENTION

The present invention is directed to a child's car seat and, more particularly, to a car seat employing a combination seat belt assembly and pivoting shield.

BACKGROUND OF THE INVENTION

A typical vehicle seat is not particularly welladapted for older infants or young children. For infants or children, it is desirable to use a car seat, including a seat portion and/or a back rest as well as some type of restraining mechanism.

The operation of the restraining mechanism is of particular importance to designers in the field of child's car seats since children restrained in child's car seats may attempt to defeat the purpose of the restraining mechanism by moving the car seat or attempting escape therefrom. In one type of arrangement, straps are connected to the car seat itself for securing the infant or child about an upper portion of the body. For example, Martel et al., U.S. Pat. No. 4,545,613 discloses an infant-restraining shoulder harness including two straps connected to the child's car seat. Each of the straps has first and second ends. The first ends of the straps are received by slots in the back rest of the child's car seat and are connected to a transverse bight disposed behind the back rest. The second ends of the harness extend through a well in the seat portion and are secured thereunder.

To secure the child's car seat, and secondarily the child, Kain U.S. Pat. No. 4,568,122 provides a child's car seat including a base and seat, a split shield openable for access, with the shield being closed when the child is in place. The shield has half-channels accepting a seat belt of the standard vehicle such that the vehicle seat belt can be strapped over the shield. Consequently, the Kain car seat employs a vehicle lap seat belt to maintain the split shield in a closed position as well as to secure the child's car seat base against a bottom section of a vehicle seat. Securing a child's car seat along an upper surface of the shield is advantageous in that it prevents the child from tampering with the barrier, but such securement is disadvantageous in that the child can conceivably tip the car seat over during use thereof.

Kain U.S. Pat. No. 4,754,999 provides at least two embodiments of a car seat employing a restraining mechanism. In the first embodiment, illustrated by FIG. 1, the child is restrained by a split barrier and a pair of shoulder harnesses. Each harness has an end connected behind a back rest of the chair and another end connected to an underside of a shield half. The harnesses are held in a relatively close position by a web slider which appears to be simply draped over an upper body portion of the child when he is secured within the car seat.

In another embodiment, illustrated by FIG. 13, a shoulder harness cooperates with a vehicle lap belt to secure the barrier as well as an upper torso portion of the child. That is, the lap belt is communicated through the barrier and a male end associated therewith is detachably connected to the female end of a vehicle shoulder harness. It should be noted that the shoulder harness female end is connected to the vehicle lap belt rather than the child's car seat, so that the vehicle lap belt is not available for securing the child's car seat to a bottom section of the vehicle seat.

Hyde, et al., U.S. Pat. No. 3,948,556 provides an infant car seat which may be oriented in a sitting or reclining position. The car seat frame is adaptable for securement along a bottom section of the car seat using a vehicle lap seat belt. A barrier associated with the seat is secured to a seat portion by a secondary belt. The secondary belt, which appears to have two ends connected to the frame as well as conventional male and female connecting ends, is disposed in contact with the barrier.

SUMMARY OF THE INVENTION

One aspect of the present invention is to provide a car seat for a child comprising a seat portion and a barrier having first and second support members extending downwardly for detachable coupling with the seat portion. A given length of the seat belt extends between the first and second support members, underneath the barrier, such that upon coupling the first and second support members to the seat portion, the child is substantially confined by the belt.

Preferably, the seat portion includes first and second connecting members. Each of the first and second barrier ends are adapted for detachable coupling with either of the first and second connecting members. The barrier is pivotally mounted to the first support member or the second support member so that the barrier can be pivoted in one of two directions depending on whether the first support member is detachably connected to the first connecting member or the second connecting member.

The first and second connecting members are also adapted to receive the female end of a typical vehicle seat belt. Consequently, when the barrier with its corresponding first and second support members is removed from the seat portion, the child can be secured within the seat portion and along a back portion of the vehicle seat by way of a shoulder harness which is operatively associated with the vehicle seat. Additionally, a channel, adapted to communicate the vehicle seat belt therethrough, is disposed within the seat portion. Accordingly, the vehicle seat belt can be employed to firmly secure the car seat along the vehicle seat.

In another aspect of the present invention a belt assembly, adaptable for use in either a car seat or a vehicle and the like, is provided. The seat belt assembly includes a belt or strap having first and second ends. The belt first end is operatively connected to a first surface via a resilient member, affording length adjustment of the belt. The belt second end is operatively mounted to a second surface. A retaining assembly cinches a section of the belt to fix the length of the belt fitted around a person's lap.

The principal objects of the present invention are to provide a car seat facilitating adequate restraint for children, yet provide convenient use by the superintending adults. When used with the shield assembly, the seat belt assembly firmly secures the child within the car seat, preventing the child from slipping under the barrier. While the length of the belt disposed beneath the barrier and between the barrier support member can be adjusted prior to use, the belt length is fixed upon coupling the barrier ends with the seat portion.

Convenience is enhanced by the dual pivoting aspect of the shield assembly. By appropriate positioning of the shield assembly relative to the seat portion, the child can be lifted out of or inserted into the car seat without encountering interference from the shield assembly. That is, the shield assembly can always be positioned along the seat portion such that the barrier can be pivoted away from the user so that it is effectively removed from the path along which the child is inserted or removed.

When the seat portion is secured to the vehicle back seat through use of the belt in conjunction with the channel disposed within the seat portion, the risk of car seat overturning is minimized.

These and other features, advantages and objects of the present invention will be further understood and appreciated by those skilled in the art by reference to the following written specification, claims and appended drawings.

DETAILED DESCRIPTION OF THE PREFERRED EMBODIMENTS

For purposes of description herein, the terms "upper", "lower," "right," "left," "rear," "front," "vertical," "horizontal" and derivatives thereof shall relate to the invention as oriented in the drawings attached herewith. However, it is to be understood that the invention may assume various alternative orientations and set sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions, and other physical characteristics relating to the embodiments disclosed herein are not to be considered as limiting, unless the claims by their language expressly state otherwise.

The reference numeral 20 (FIG. 1) generally designates a child's car seat embodying the present invention. Child's car seat 20 is particularly adapted for use on vehicle car seats and the like, such as the illustrated vehicle car seat 22. As is conventional, vehicle car seat 22, which in the present example is located in a back portion of a vehicle driving compartment, includes a bottom section 24, back section 26 and lap belt 28. As is less common for vehicle car seats situated in the back portion of the driver's compartment, vehicle car seat 22 is outfitted with at least one harness belt 30 (FIG. 11), such that the typical user of vehicle car seat 22 can use one or both of vehicle lap belt 28 and harness belt 30.

Figure 1:
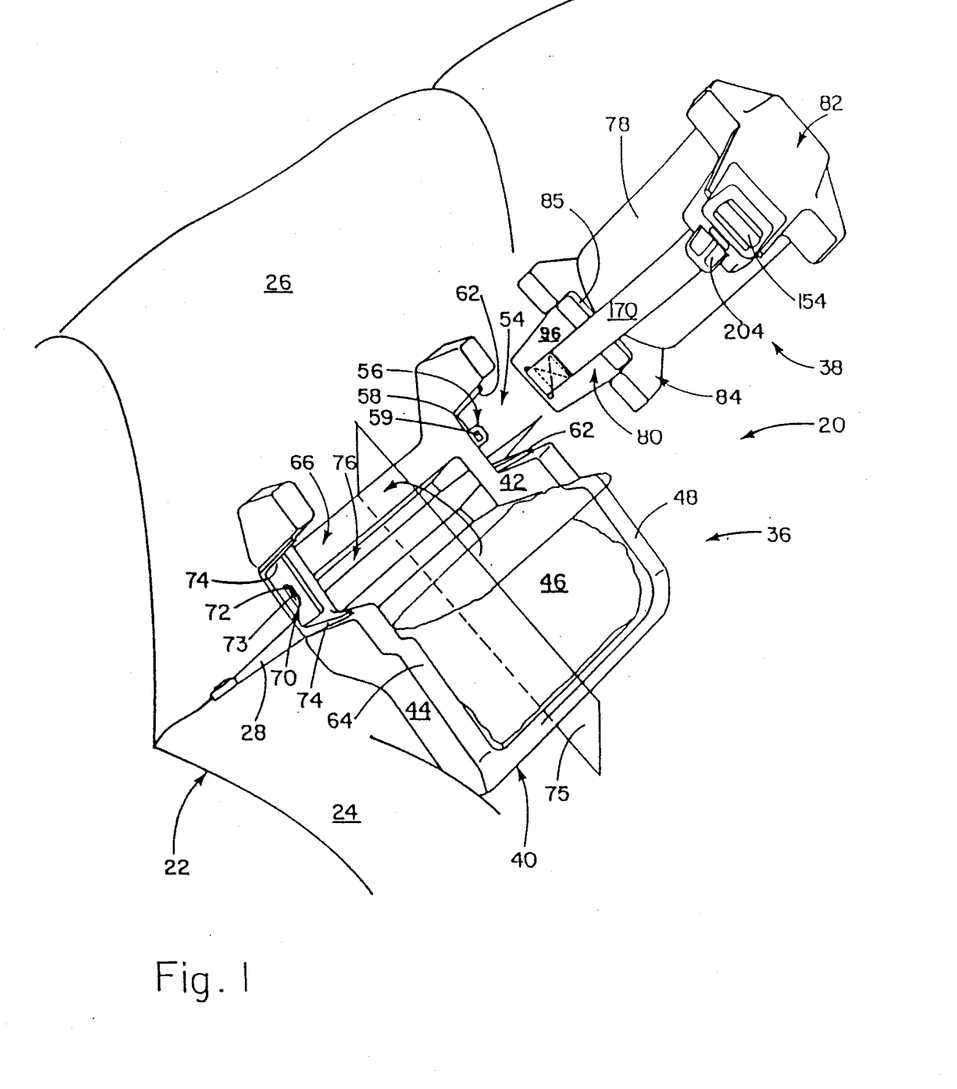
FIG. 1 is a perspective view of a vehicle seat on which a partially exploded child's car seat, embodying the present invention, is positioned.

Child's car seat 20 (FIG. 1) comprises a seat assembly 36 and shield assembly 38. Seat assembly 36 has a base 40 integrally housed with a first base sidewall 42 and second base sidewall 44. In the present example, base 40, along with sidewalls 42 and 44, are preferably constructed of thermal plastic materials. The base 40 is overlapped by a base cover 46, extending rearwardly of a front edge of base 40 to cover substantially all of a top surface of base 40 disposed between sidewalls 42 and 44. Base cover 46 is foldable so that it can be folded away from a rear section of base 40, and in the preferred embodiment, base cover 46 is a conventional vinyl covered cushion. FIG. 1 illustrates base cover 46 in a folded-away position.

First base sidewall 42 (FIGS. 1 and 2) defines a first base ledge 48 and a substantially U-shaped first base recess 54 therein. In the preferred embodiment, a first base plate 56 is mounted toward a rearward section of first base sidewall 42 by way of conventional means. First base plate 56, which is typically constructed of durable metal, includes a first base plate male connector 58, having an aperture 59 therein, protruding outwardly into first base recess 54. Within first base recess 54 are first guide ribs 62 which facilitate insertion of shield assembly 38 into first base recess 54.

The construction of second base sidewall 44 is similar to that of first base sidewall 42. More specifically, second base sidewall 44 defines second base ledge 64 and includes second base recess 66. Additionally, a second base plate 70 which is typically constructed of durable metal, is mounted to a rearward section of second base sidewall 44. As with first base plate 56, second base plate 70, includes a second base plate male connector 72, having an aperture 73, protruding outwardly into first base recess 66. Finally, second guide ribs 74 extend upward within second base recess 66 to facilitate insertion of shield assembly 38 into second base recess 66. In the preferred embodiment, first base recess 54 and second base recess 66, as well as the structures associated therewith, are mirror symmetric about a plane 75 bisecting base 40. Such mirror symmetry allows for advantageous usages, which will be discussed in further detail below.

Figure 2:
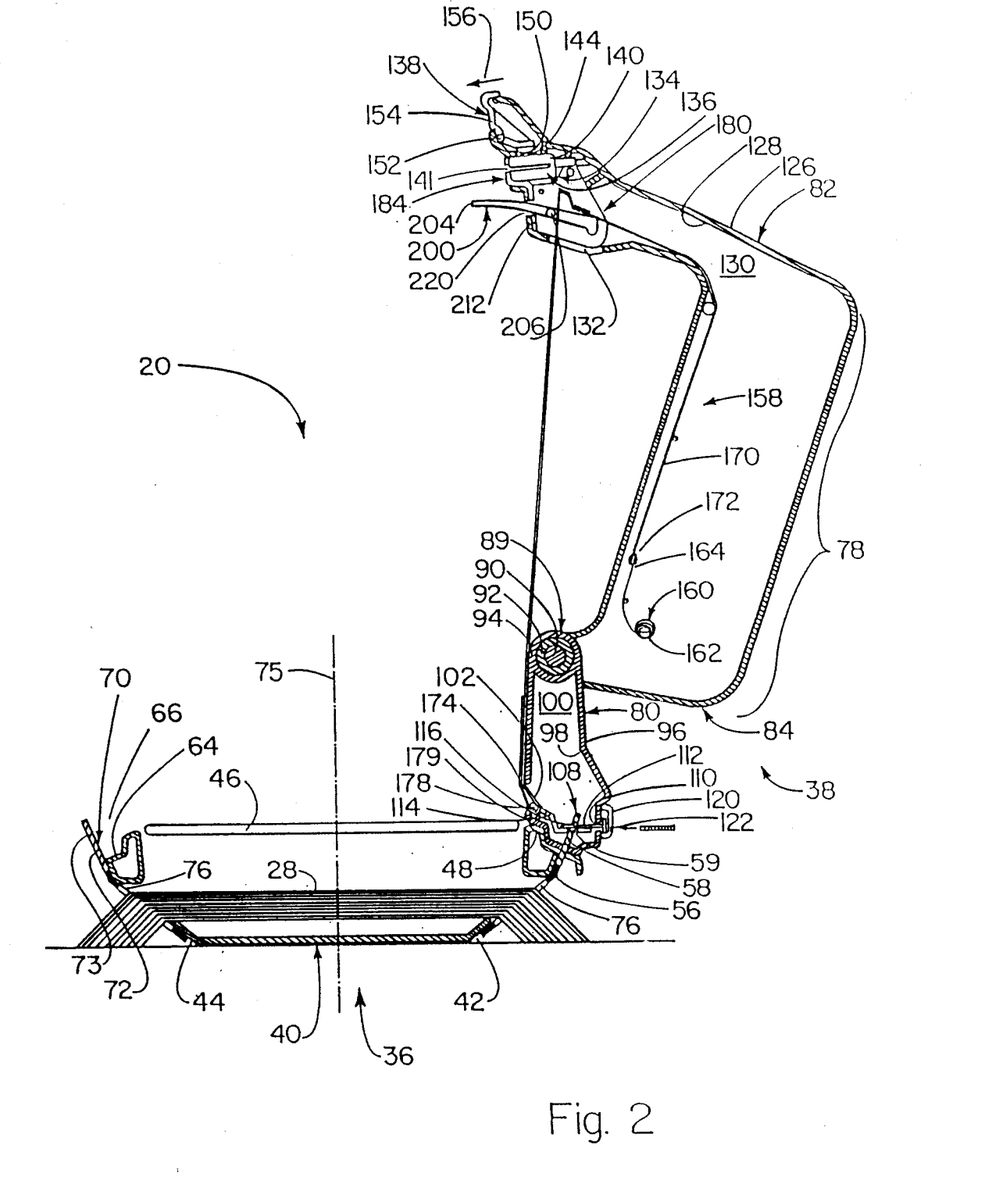
FIG. 2 is a front cross-sectional view of the child's car seat illustrating features of the seat belt assembly and with an upwardly barrier in an open position so that the child in the seat portion.
Figure 5:
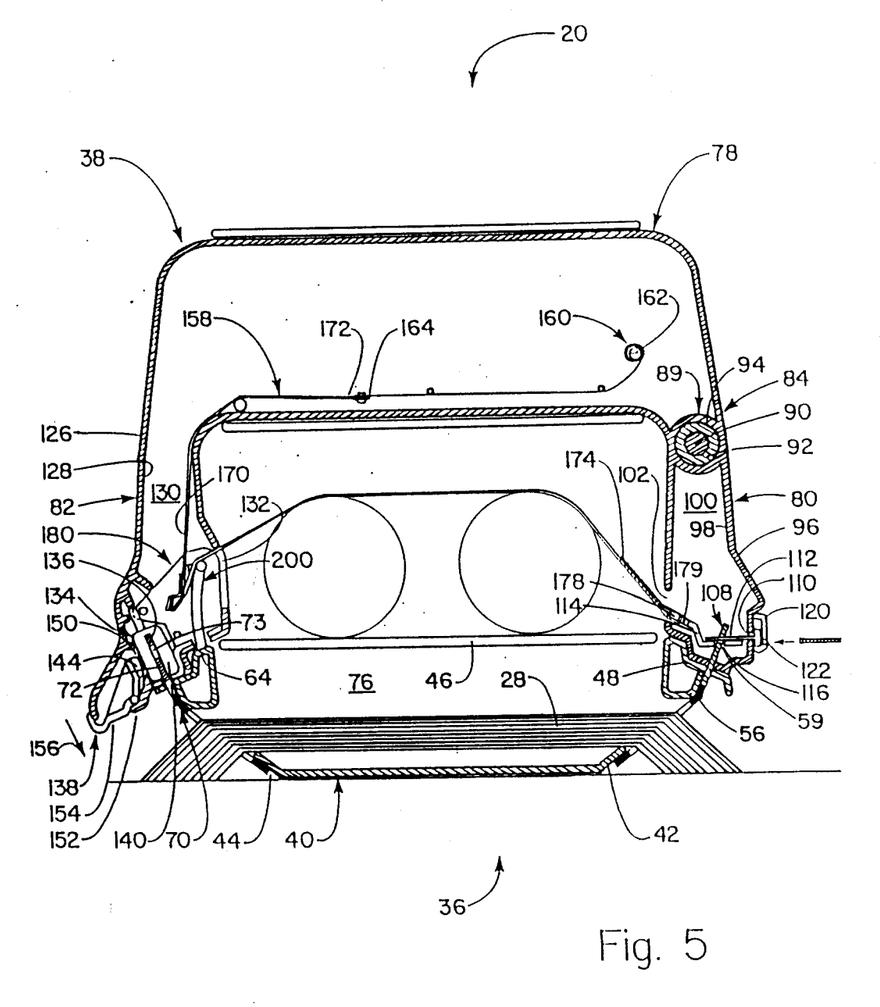
FIG. 5 is a front cross-sectional view of the child's car seat with the barrier in a closed position and further illustrating the seat belt assembly.
Figure 6:
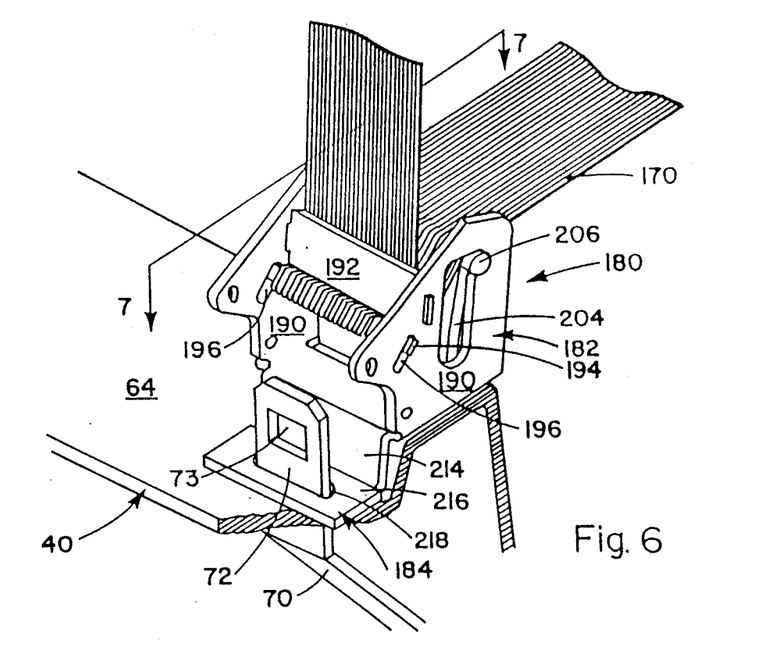
FIG. 6 a broken-away, perspective view of the retaining assembly along a ledge of a base of the child's car when the barrier is in the closed position.
Figure 7:
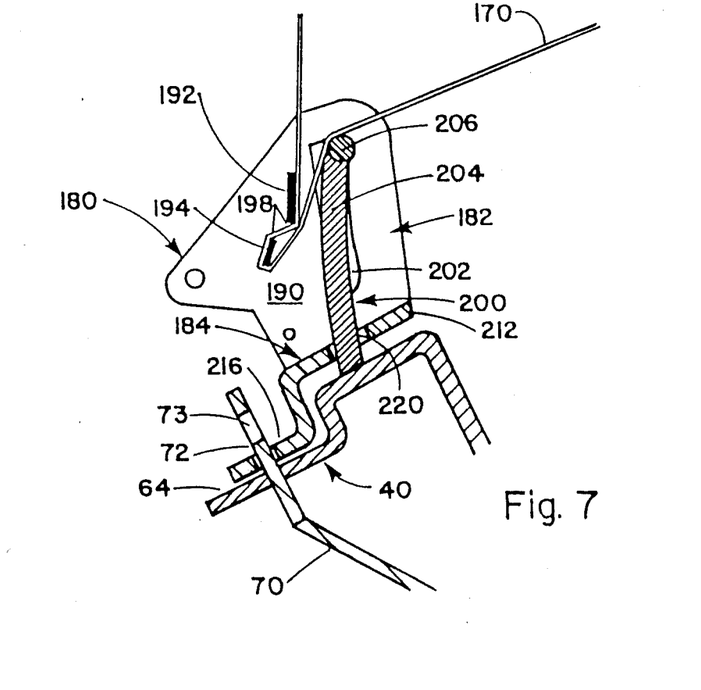
FIG. 7 is a side cross-sectional view of the retaining assembly taken along plane 7—7 of FIG. 6.

In a lower section of base 40, and toward the rear of child's seat 20 is a channel 76. As best illustrated in FIGS. 1, 2 and 5, channel 76 communicates with the surrounding environment, such that vehicle lap belt 28 is readily threaded therethrough. Vehicle lap belt 28 cooperates with channel 76 to secure child's car seat 20 to vehicle car seat 22 at the back thereof. Due to the location of channel 76 within base 40, when vehicle lap belt 28 is received within channel 76, seat assembly 36 is firmly held against bottom section 24 and back section 26 of vehicle car seat 22. More specifically, the degree to which seat assembly 36 can be rotated in any given direction is considerably limited when base 40 is secured along its bottom section by vehicle lap belt 28. Consequently, it is difficult for a child seated within child's car seat 20 to tip the same over since considerable retaining forces are applied along a lower section thereof.

Shield assembly 38 includes a barrier 78 as well as a first support 80 and second support 82. One support member of barrier 78 (FIG. 1) is integrally connected to second support 82 at one end of barrier 78, and the other end of barrier 78 is integrally connected to an upper support section 84. First support 80 is pivotally mounted to upper support Section 84. Upper support section 84 defines a recess 85 in which first support 80 is pivoted. In one example, pivoting is effected through employment of a pivoting mechanism 89 (FIGS. 2 and 5) including ends 90, sleeves 92 and bearing surfaces 94. Ends 90, one of which is illustrated in FIG. 2, are integrally connected to upper side edges of first support 80 and aligned along an axis of rotation. Sleeves 92 are adapted to receive ends 90 and are lined with bearing surfaces 94. Accordingly, when ends 90 are inserted into sleeves 92, first support 80 is freely pivotal within recess 85 through an arc of at least 90 degrees.

As best illustrated in FIGS. 2 and 5, first support 80 has an exterior surface 96, and an interior surface 98 defining a hollow cavity 100. Along one side of first support 80 is an opening 102, the significance of which will be discussed in further detail below. As best illustrated in FIG. 5, during normal use of child's car seat 20, first support 80 and second support 82 are seated within first base recess 54 and second base recess 66. As will be discussed in further detail below, the child's car seat 20 could be operated with first support 80 seated within second base recess 66, and second support 82 seated within first base recess 54. The insertion of supports 80 and 82 into base recesses 54 and 66 is facilitated by the addition of elongate guide recesses (not shown) disposed along inner sides of supports 80 and 82.

Locking mechanism 108 (FIGS. 2 and 5), which, in the present example, is employed to lockingly secure first support 80 within first base recess 54, includes lock plate slot 110, lock plate 112 and support plate 114. The following discussion is equally applicable for the example in which locking mechanism 108 is employed to lockingly secure first support 80 within second base recess 66. Support plate 114, which as explained below, serves more than one purpose, is operatively mounted to interior wall 98 of first support 80 and includes a substantially horizontally-oriented ledge. Lock plate slot 110, which is disposed within a wall of first support 80 and communicates first support hollow cavity 100 to the surrounding environment, receives lock plate 112. When inserted through lock plate slot 110, lock plate 112 rests upon the ledge of support plate 114. Support plate 114 includes a support plate slot 116 which is adapted to receive the first base plate male connector 58. When first base plate aperture 59 is aligned with lock plate slot 110, lock plate 112 can readily be inserted therethrough to secure first support 80 within first base recess 54.

A lock plate cover 120 (FIGS. 2 and 5) is pivotally connected to exterior wall 96 of first support 80 and includes a coin-operating slot 122. Lock plate cover 120 overlaps lock plate slot 110 when lock plate 112 is completely inserted within first support 80. To access covered lock plate 112, a coin is employed in conjunction with coin-operating slot 122 to pivotally displate lock plate cover 120 upward. Due to the presence of lock plate cover 120, it is difficult for the child seated within car seat 20 to tamper with locking mechanism 108. More specifically, unless the child can determine that lock plate 112 is disposed beneath lock plate cover 120, there is no way for her to disengage locking mechanism 108 and thus pull first support 80 out of first base recess 54.

Second support 82 has an exterior surface 126 and an interior surface 128 defining a hollow cavity 130 therein. Along one side of second support exterior surface 126 is an opening 132 which will be discussed in further detail below. In the preferred embodiment, a latching mechanism 134 for securing second support 82 within second base recess 66 is disposed within a lower section of hollow cavity 130. As should be appreciated, the present discussion is equally applicable to the example in which second support 82 is secured within first base recess 54. As best illustrated in FIG. 2, latching mechanism 134 includes a latch sub-mechanism 136 and actuating sub-mechanism 138. Latch sub-mechanism 136 includes a latch connector 140, and a latch connector channel 141. Defined within latch connector 140 is an aperture (not shown) receiving release button 144. A conventional latching member (not shown), which is operatively associated with release button 142, is employed to secure latch connector 140 on second base plate male connector 72. As is conventional, when the second male connector 72 is inserted into latch connector channel 141, the latching sub-mechanism 136 is biased in a closed position. Latching sub-mechanism 136 is engaged by moving latch connector channel 141 downward relative to second base plate male connector 72 until the latching member is seated within male connector aperture 73. The second support 82 is released from the latched condition by simply pressing release button 144 and pulling upward on barrier 78 or second support 82.

The magnitude of force required to engage release button 144 makes that actuation of release button 142 with a finger difficult, even for those users with moderately strong hands. Actuating sub-mechanism 138 (FIGS. 2 and 5), which includes actuating surface 150, pivot pin 152 and pull handle 154, is employed to facilitate actuation of release button 144. Actuating surface 150 normally rests against release button 144, thus biasing latch sub-mechanism 136 in a closed position. Latching mechanism 134 is conventionally designed such that latch sub-mechanism 136 is in a locked state when release button 144 is depressed, and in an open state when release button 144 is released. Pivot pin 152 and pull handle 154 are supported by second support interior surface 128 and second support exterior surface 126, respectively, thus providing for pivotal displacement of actuating surface 150 away from release button 142 when pull handle 154 is pulled, in a direction consistent with arrow 156. As actuating surface 150 is withdrawn from contact with release button 144, latch sub-mechanism 136 is disengaged so that second support 82 can be freely removed from second base plate male connector 72.

Shield Assembly 38 is provided with a seat belt assembly 158 (FIGS. 2 and 5), including a spring 160 having a first end 162 and second end 164, as well as a belt 170 having a first end 172 and second end 174. A spring connector (not shown), which is mounted along an interior surface of barrier 78, is employed to secure spring first end 162, while spring second end 164 is conventionally secured to belt first end 172. As mentioned above, support plate 114 of locking mechanism 108 not only serves to support lock plate 112, but includes a female end 178, which is positioned adjacent to first support opening 102, to receive belt second end 174. Support plate female end 178 is typically provided with a slot 179 through which belt second end 174 is threaded for overlapping securement.

Figure 3:
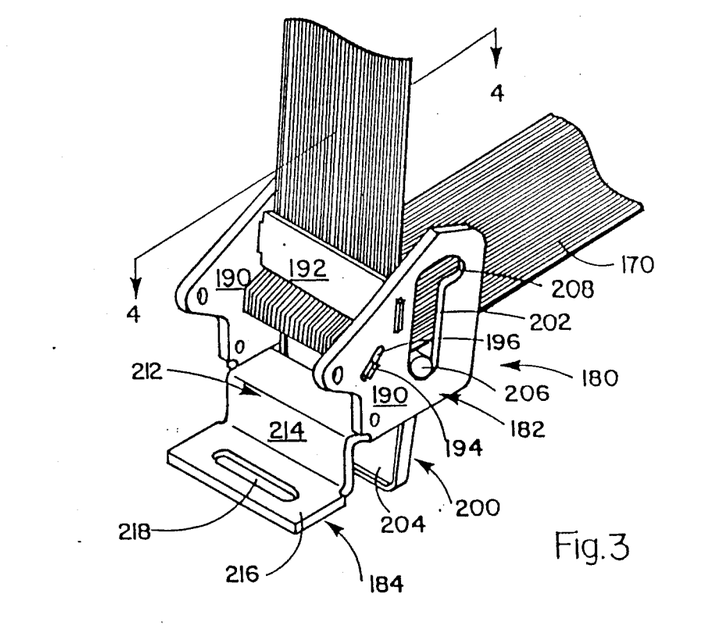
FIG. 3 is a broken-away perspective view of a retaining assembly employed in a seat belt assembly when the barrier is in the open position.
Figure 4:
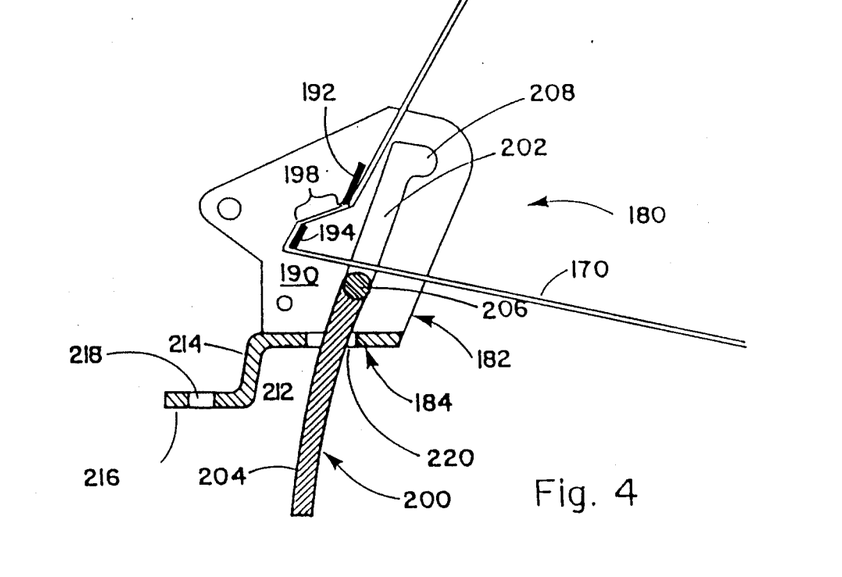
FIG. 4 is a side cross-sectional view of the retaining assembly taken along plane 4—4 in FIG. 3.

Seat belt assembly 158 (FIGS. 2-7) is selectively retained within a retaining assembly 180 which is mounted within a lower section of second support hollow cavity 130, adjacent to latch connector 140. As best illustrated in FIGS. 3 and 4, retaining assembly 180 includes retaining sub-assembly 182 and mounting sub-assembly 184. In the preferred embodiment, mounting sub-assembly 182 provides support for both latch connector 140 and retaining sub-assembly 182.

Belt retaining sub-assembly 182 includes sidewalls 190 which are spaced in relation to one another so as to allow for the insertion of belt 170 therebetween. Additionally, belt retaining sub-assembly 182 further includes belt aligning plate 192 as well as pinch rod 194 and pinch rod channels 196. Belt aligning plate 192 is secured between sidewalls 190 while pinch rod 194, which is received by pinch rod channels 196, is freely slidable within the same. Pinch rod slot 198 is defined between belt aligning plate 192 and pinch rod 194, and thus varies in length as pinch rod 194 is positioned along pinch rod channels 196.

As best illustrated in FIGS. 3 and 4, belt retaining sub-assembly 182 is further defined by locking tongue mechanism 200 and locking tongue channels 202 (partially shown). Locking tongue mechanism 200 includes locking tongue 204 and locking tongue axle 206. Locking tongue channels 202 receive locking tongue axle 206 and locking tongue 204 is provided with the ability to freely ride up and down locking tongue channels 202 via locking tongue axle 206. Locking tongue channels 202 define offset channel sections 208 which, as explained below, are employed to seat tongue axle 206.

In the preferred embodiment, a section of belt 170 is loosely secured within retaining sub-assembly 182 (FIG. 3) after positioning the section of belt 170 adjacent to an inner surface of plate 192, then through pinch rod slot 198, around pinch rod 194, across a top surface of locking tongue 204, and out of opening 132 toward first support opening 102, where, as described above, belt second end 174 is secured to female support member 178. As will be explained in further detail below, the section of belt 170 is loosely retained by retaining sub-assembly 182 until supports 80 and 82 are secured within base recesses 54 and 66.

Mounting sub-assembly 184 includes a mounting plate 212 partitioned by a neck 214. On one side of neck 214 is a connection ledge 216 having a connection slot 218 disposed therein. The connection slot 218 is aligned with latch connector channel 141 (FIGS. 2 and 5) so that each of them can easily be slid over a selected one of base male connectors 58 and 72. Mounting plate 212 further includes a mounting plate channel 220 (FIGS. 3 and 7), which is aligned with locking tongue mechanism 200. Mounting plate channel 220 is adapted to allow for locking tongue 204 to be freely moved therethrough. As best illustrated in FIGS. 2 and 5, latch connector 140 and retaining assembly 180 are conventionally secured to interior wall 128 of second support 82 via mounting plate 212, using conventional fasteners (not shown) such as rivets, screws, or the like. It should be further appreciated with reference to FIGS. 5 and 7, that bottom edges of retaining sub-assembly sidewalls 190 and the surface of mounting plate 212 conform in shape to either of first base ledge 48 and second base ledge 64.

Figure 8:
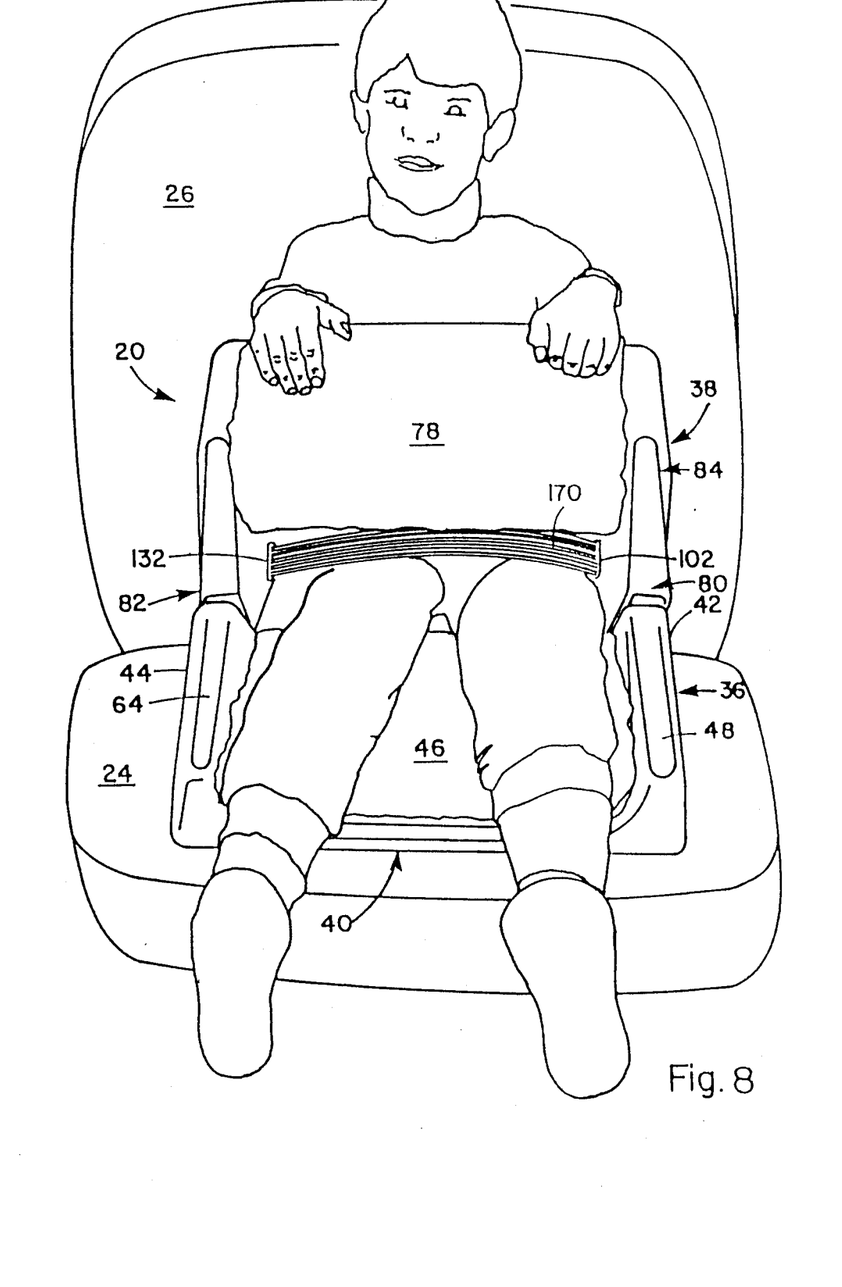
FIG. 8 is a perspective view of the child's car seat with a child seated therein, as well as secured with the barrier and the seat belt assembly.

In one mode of operation (FIG. 8), a child is secured on seat assembly 36 through use of shield assembly 38, and accordingly seatbelt assembly 158. To connect shield assembly 38 to seat assembly 36, barrier 78 is pivoted upward relative to first support 80. Then the locking mechanism 108 housed in first support 80 is disengaged by pulling lock plate 112 outward from lock plate slot 110. First support 80 is then inserted into first base recess 54 (FIG. 2) by directing elongate guide recesses (not shown) down along first guide ribs 62 until the bottom surface of first support 80 abuts the base of first base recess 54 and first base plate male connector 58 is fully inserted within support plate slot 116. As should be appreciated from the discussion above, the present discussion of operation which is directed toward an example in which first support 80 is seated within first base recess 54, is equally applicable to an example in which first support 80 is seated within second base recess 66. Upon securing first support 80 (FIGS. 5 and 8) within first base recess 54, a child is appropriately positioned on base 40 and second support 82, along with barrier 78, is pivoted about bearing surface 92 until latching mechanism 134 is secured relative to second base plate 70, i.e. until second base plate male connector 72 is fully inserted within latch connector 140.

Assuming that a child is seated within seat assembly 36 and that supports 80 and 82 are secured within base recesses 54 and 66, respectively, seat belt assembly 158 is engaged. Function of seat belt assembly 158 can be appreciated by reference to FIGS. 3-4 and 6-7. In the open position (FIGS. 3 and 4) locking tongue 204 protrudes out of mounting plate channel 220, and the belt section contained within retaining sub-assembly 182 is in a slackened state so that a length of belt 170 extending between first support opening 102 and second support opening 132 (FIG. 2) can be adjusted to accomodate for child size. As barrier 78 along with second support 82 is pivoted downward and second support 82 contacts second base recess 66 (FIGS. 5 and 7), locking tongue 204 engages ledge 64 and is forced upward along locking tongue channels 202 until latch connector 140 is latched with second base plate male connector 72.

Upon reaching the top of the tongue channels 202, locking tongue axle 206 is seated within offset channel sections 208. As should be appreciated, offset channel sections 208 contribute to the securement of locking tongue axle 206 within locking tongue channels 202.

Pursuant to latching, locking tongue axle 206 is displaced to the top of locking tongue channels 202 and that section of belt 170 overlapping pinch rod 194 is cinched, and effectively locked between belt aligning plate 192 and pinch rod 194. When locking tongue axle 206 is at the top of locking tongue channels 202 (FIGS. 5 and 8), belt 170 is secured about the legs of the child and locked within retaining sub-assembly 182. As can be appreciated by examining FIGS. 3-4 and 6-7, belt 170 is retained by the dual action of pinch rod 194 acting in conjunction with both of belt aligning plate 192 and locking tongue mechanism 200. More specifically, the upward movement of locking tongue 204 within locking tongue channels 202 effects the cinching action between belt aligning plate 192 and pinch rod 194.

Due to the fact that belt 170 is fixed when second support 82 is secured by latching mechanism 134, unwanted movements by the child are minimized, and there is virtually no way the child can slip out of seat belt assembly 158. Of equal significance is the way in which belt 170 is secured within shield assembly 38. That is, the child cannot access retaining sub-assembly 182 to loosen belt 170. More generally, since the mechanisms and assemblies responsible for fixing belt 170 between first support opening 102 and second support opening 132 are substantially contained within first support hollow cavity 100, second support hollow cavity 130 and a hollow cavity associated with barrier 78, there is no way for the child to tamper with belt 170 during use thereof.

Figure 9:
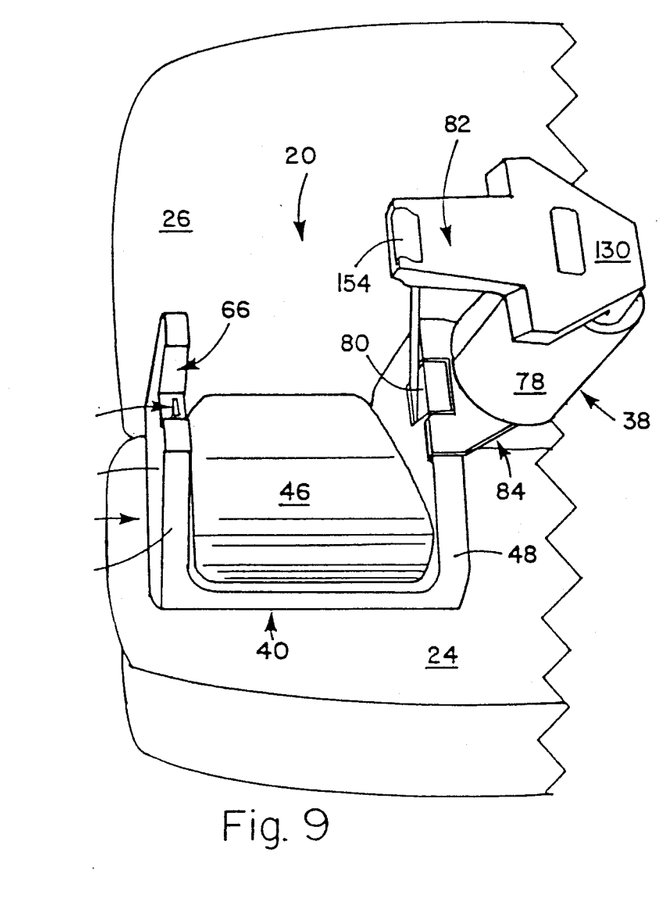
FIG. 9 is a perspective view of the child's car seat with the barrier pivoted in a first direction.
Figure 10:
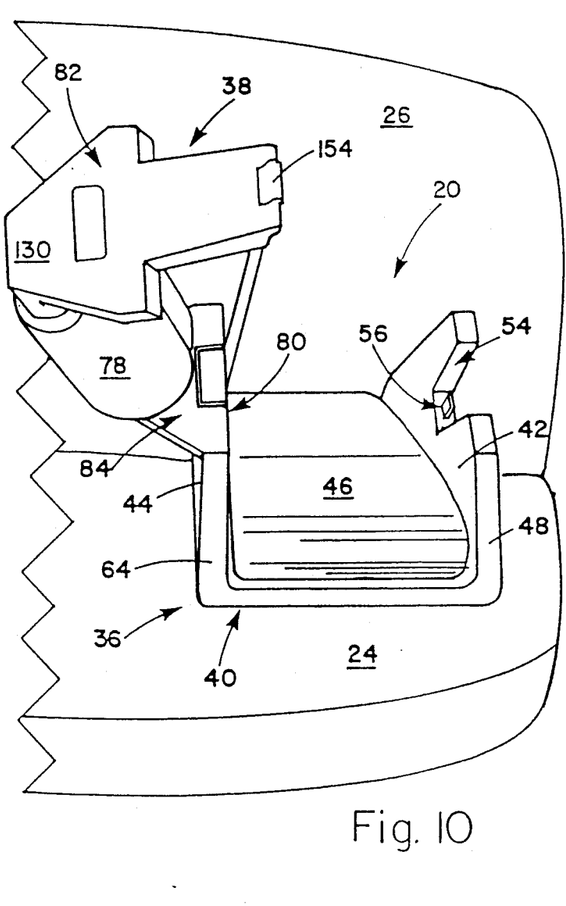
FIG. 10 is a perspective view of the child's car seat with the barrier pivoted in a second direction.

As will be appreciated by those skilled in the art, seat belt assembly 158 can be used apart from a child's car seat 20. There are numerous other environments in which seat belt assembly 158 could conceivably be employed. For example, seat belt assembly 158 could be used in conjunction with a regular seat belt to provide securement for an adult in a vehicle seat or the like. As alluded to above, due to the mirror symmetry of child's car seat 20 about plane 75 (FIG. 1), the child's car seat 20 can be operated in one of two positions (FIGS. 9 and 10) since shield assembly 38 is adapted to be secured with respect to seat assembly 36 in one of two positions. In the first position, first support 80 is inserted within the first base recess 54 (FIG. 9) such that barrier 78 and second support 82 are pivoted from right to left. Use in the first position is appropriate when the child's car seat is to be positioned on the vehicle car seat 22 located behind the "passenger seat," since the child is then optimally inserted or withdrawn from seat assembly 36 when barrier 78 and second support 82 are pivoted away from the passenger side. In the second position (FIG. 10), first support 80 is located 180 degrees with respect to the first position so that first support 80 is locked within second base recess 66. In contrast to use of shield assembly 38 in the first position, in the second position barrier 78 and second support 82 pivot from left to right. Child's car seat 20 is best suited for positioning behind the "driver's seat" when barrier 78 and second support 82 are used in the second position since insertion or withdrawal of the child from seat assembly 36 is optimally facilitated when shield barrier 78 and second support 82 are pivoted away from the driver's side.

Figure 11:
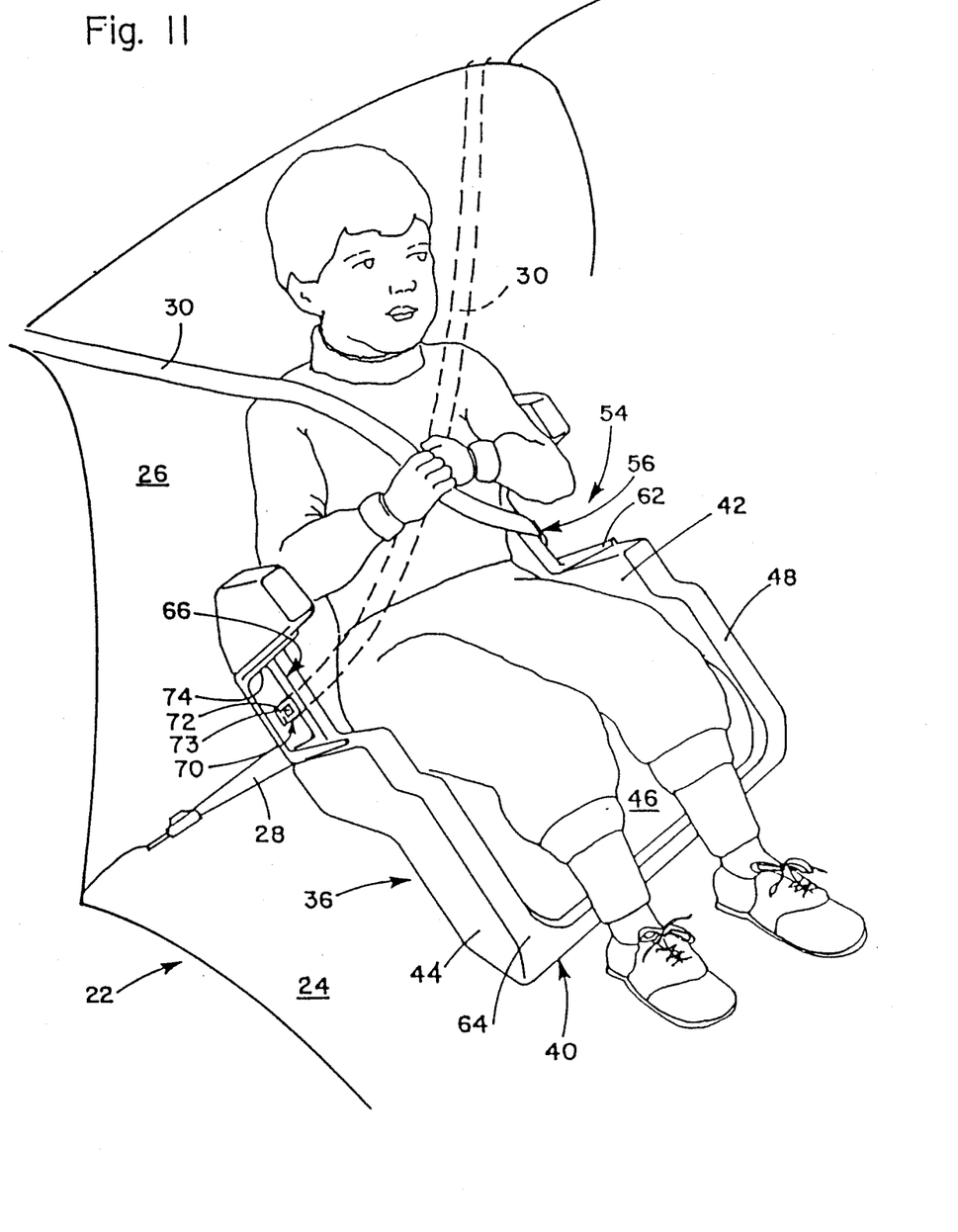
FIG. 11 is a perspective view showing the child's car seat with the barrier removed, positioned on a fragmentary portion of the vehicle seat, and having a child secured therein by a harness operatively associated with the vehicle seat.

For some period of time, harness seat belts have been standard equipment for the front seats of most vehicles. Nevertheless, this has not, apparently, been the case for the back seat. It is only in the recent past that some automobile manufacturers have begun to appreciate the added safety benefits provided by installing harness belts in the back seats of vehicles. As best illustrated in FIG. 11 each of first base plate male connector 58 and second base plate male connector 72 are adapted to receive harness belt 30, for purposes of securing the child, when shield assembly 38 is removed from seat assembly 36.

As will be appreciated, not all children require the amount of restraint provided by shield assembly 38 with its seat belt assembly 158. Many of the advantageous safety features described above, nonetheless, are still achieved when using harness belt 30 with seat assembly 36. For example, it is still possible to secure base 40 of car seat 20 along vehicle seat 22 through use of vehicle lap belt 28 and channel 76. Additionally, for many children, the connection provided between the standard female seat belt connector and either one of first base plate male connector 58 and second base plate male connector 72 is suitable for firmly and safely supporting the child. As should also be appreciated, since male connectors 58 and 72 are provided on either side of seat assembly 36, the harness belt 30 can readily be coupled to seat assembly 36 whether the same is positioned on the driver's side or the passenger's side.

In the foregoing description, it will be readily appreciated by those skilled in the art that modifications may be made to the invention without departing from the concepts disclosed herein. Such modifications are to be considered as included in the following claims unless these claims by their language expressly state otherwise.

The embodiments of the invention in which an exclusive property or privilege is claimed are defined as follows:

1. A car seat for a child comprising:
    a seat portion adapted to support the child;
    first means for restraining the child, said first means including a barrier having a first longitudinal axis as well as first and second support members extending downwardly relative to said barrier, said first and second support members being detachably coupled to said seat portion; and
    a belt having a portion with a second longitudinal axis, said portion of said belt extending from said first support member to said second support member, said portion of said belt underlying said barrier, and said portion of said belt being spaced from said barrier wherein, when the child is secured within the car seat using said first means, said second longitudinal axis of said portion of said belt is substantially parallel to said first longitudinal axis of said barrier and a substantial portion of said portion of said belt is positioned adjacent to and across a substantial portion of the child's lap.

2. The car seat of claim 1, wherein the car seat is adapted for use with a vehicle seat having a bottom section for supporting the legs and buttocks of a person as well as a back section for supporting the back of the person, and wherein said seat portion includes a base surface adapted to rest on the bottom section of the vehicle seat, the car seat further comprising:
    first and second recesses disposed in said seat portion, each of said recesses extending upwardly from said base surface, said first and second recesses being adapted to removably receive said first support member and said second support member, respectively, for detachable coupling of said first and second support members with said seat portion; and
    wherein one of said first support member and said second support member is pivotally connected to said barrier allowing for pivotal movement of said barrier relative to one of said first support member and said second support member.

3. The car seat of claim 1, wherein: said barrier is a single piece.

4. The car seat of claim 1, further comprising:
    means for cinching a section along said belt wherein said portion of said belt remains substantially fixed in position during securement of the child in the car seat.

5. The car seat of claim 1, wherein one of said first support member and said second support member has a hollow cavity, and said hollow cavity has locking means housed therein adapted for selectively securing one of said first support member and said second support member to a section of said seat portion, said locking means further comprising:
- connecting means attached to said seat portion wherein said connecting means includes an opening in which at least one of said first support member and said second support member is adapted to be detachably coupled;
- a locking member;
- a slot being defined in one of said first support member and said second support member, said slot being adapted to receive said locking member; and
- support means disposed within said one of said first support member and said second support member for maintaining said locking member in a substantially lateral position wherein, when one of said first support member and said second support member is positioned over said connecting means, one of said first support member and said second support member is locked relative to said seat portion as long as said locking member is inserted through both of said slot and said opening.

6. The car seat of claim 1, further comprising:
- a latching member operatively connected to one of said first support member and said second support member;
- a release member operatively connected to said latching member; and
- a handle pivotally mounted about a pivot axis disposed along a portion of one of said first support member and said second support member, wherein upon pivoting said handle about said pivot axis said release member is actuated so that one of said first support member and said second support member can be detached from said seat portion.

7. A car seat for a child for use with a vehicle seat having a bottom section for supporting the legs and buttocks of a person as well as a back section for supporting the back of the person, the car seat comprising:
- a seat portion including a base surface adapted to rest on the bottom section of the vehicle seat during use of the car seat and a support surface adapted to directly underlie the legs and buttocks of the child while seated within the car seat;
- a channel disposed between said base surface and said support surface for receiving a vehicle seat belt;
- first means for restraining the child including a barrier and first and second support members, said first means including means for pivoting said barrier about a portion of one of said first support member and said second support member;
- first and second recesses disposed in said seat portion, each of said recesses extending upwardly from said base surface and each of said recesses having substantially the same dimensions, said first and second recesses being adapted to removably receive at least end portions of said first support member and said second support member, respectively, each of said first and second support member portions having substantially the same dimensions; and
- means for detachably coupling said end portions of said first support member and said second support member within said first recess and said second recess of said seat portion, respectively, said means including first and second male connector means, each of said first and second male connector means being disposed within said first and second recesses and each extending upwardly from bottoms of said first and second recesses, respectively, each of said first and second male connector means having a free end and a fixed end with the free end being vertically above said fixed end when the car seat is in its normal position for supporting a child, each of said male connectors for engaging one of said first and second support members;
- wherein said barrier is pivotal in one of a first direction and a second direction depending upon whether said first support member is inserted into one of said first recess and said second recess.

8. The car seat of claim 7, wherein:
said barrier is a single piece.

9. A car seat for use wit a vehicle seat having a bottom section for supporting the legs and buttocks of a person as well as a back section for supporting the back of the person, the car seat comprising:
- a seat portion including a base surface adapted to rest on the bottom section of the vehicle seat during use of the car seat and a support surface adapted to directly underlie the legs and buttocks of the child while seated within the car seat;
- a channel disposed between said base surface and said support surface for receiving a vehicle seat belt;
- first means for restraining the child including a barrier having a first longitudinal axis and first and second support members, said first means including means for pivoting said barrier about a portion of one of said first support member and second support member;
- a belt having a portion with a second longitudinal axis, said portion of said belt extending from said first support member to said second support member wherein, when the child is secured within the car eat using said first means, said second longitudinal axis of said portion of said belt is substantially parallel to said first longitudinal axis of said barrier and a substantial portion of said portion of said belt is positioned adjacent to and across a substantial portion of the child's lap;
- first and second recesses disposed in said seat portion, each of said recesses extending upwardly from said base surface, said first and second recesses being adapted to removably receive said first support member and said second support member, respectively; and
- means for detachably coupling end portions of said first support member and said second support member within said first recess and said second recess of said seat portion, respectively;
- wherein said barrier is pivotal in one of a first direction and a second direction depending upon whether said first support member is inserted into one of said first recess and said second recess.

* * * * *